United States Patent
van Breda et al.

(10) Patent No.: US 8,655,684 B2
(45) Date of Patent: Feb. 18, 2014

(54) METHOD FOR OPERATING A RETURN GENERATION SYSTEM AND A SYSTEM FOR GENERATING RETURNS

(75) Inventors: John Hilgon van Breda, Mellingen (CH); Jan Altus Van der Merwe, Welgedacht (ZA); Bernard Racine, Quebec (CA); Paul Kruger Zondagh, Bellville (ZA); Charle François Naude Hugo, Cape Town (ZA); Francois Petrus Möller, Durbanville (ZA)

(73) Assignee: swissGRO GmbH, Mellingen (CH)

( * ) Notice: Subject to any disclaimer, the term of this patent is extended or adjusted under 35 U.S.C. 154(b) by 803 days.

(21) Appl. No.: 11/911,982

(22) PCT Filed: Apr. 21, 2005

(86) PCT No.: PCT/EP2005/051791
§ 371 (c)(1),
(2), (4) Date: May 12, 2008

(87) PCT Pub. No.: WO2006/111204
PCT Pub. Date: Oct. 26, 2006

(65) Prior Publication Data
US 2009/0287507 A1 Nov. 19, 2009

(51) Int. Cl.
*G06Q 40/00* (2012.01)

(52) U.S. Cl.
USPC ............ 705/4; 705/35; 705/39; 705/36 R

(58) Field of Classification Search
CPC .................................................. G06Q 40/00
USPC ............................... 705/4, 35, 36 R, 39
See application file for complete search history.

(56) References Cited

U.S. PATENT DOCUMENTS

| | | | | |
|---|---|---|---|---|
| 5,655,085 A * | 8/1997 | Ryan et al. | | 705/4 |
| 5,907,828 A * | 5/1999 | Meyer et al. | | 705/4 |
| 6,085,174 A * | 7/2000 | Edelman | | 705/36 R |
| 6,636,834 B1 * | 10/2003 | Schirripa | | 705/36 R |
| 7,089,201 B1 * | 8/2006 | Dellinger et al. | | 705/35 |
| 8,010,388 B2 * | 8/2011 | Joyce | | 705/4 |
| 2004/0177022 A1 * | 9/2004 | Williams et al. | | 705/36 |

* cited by examiner

*Primary Examiner* — Daniel Felten
(74) *Attorney, Agent, or Firm* — Shoemaker and Mattare

(57) ABSTRACT

A method for operating a return generation system comprises several steps. In a first step, a group of a plurality of individuals is determined. In a further step, at least one asset is gathered from each of said individuals. Said at least one asset is subsequently transferred to a pool of assets. Upon death of one of the individuals, a rate to be distributed to the surviving individuals is automatically calculated. Subsequently, the assets are distributed among the surviving individuals.

24 Claims, 14 Drawing Sheets

Fig. 5c

| Score | 5 | 10 | 15 | 20 | 25 | 30 | 35 | 40 |
|---|---|---|---|---|---|---|---|---|
| Confidence level | 95% | 90% | 85% | 80% | 75% | 70% | 65% | 60% |
| Maximum equity% | 50% | 60% | 70% | 75% | 80% | 85% | 90% | 95% |

METHOD FOR OPERATING A RETURN GENERATION SYSTEM AND A SYSTEM FOR GENERATING RETURNS

In view of demographic changes, current pension systems are non-sustainable or may become non-sustainable without increasing the period of working life. Currently, in industrial countries, the period of working life is substantially constant or even has been reduced in the past few decades. In parallel, the demographic changes are moving towards an inversion of the population pyramid in many industrial countries. Furthermore, in view of an improved medical system, the average age of individuals is increasing. These factors in combination create considerable problems for the insurance industry or for governments. Insurances or governments are no longer capable of providing guarantees for adequate retirement payments. Because in traditional societies one of the major threats was the risk of premature death, life policies were a standard tool in view of insurance against this risk. In view of the trends in demographic evolution, one major threat of each individual is to lose financial independency at higher age. In particular, insurances or governments may not be capable to guarantee for annual payments and personal savings may not be sufficient for people achieving very high ages.

There therefore have been proposals for longevity insurance systems. One major drawback of such systems is that in view of the difficulty of determination of a future average lifetime of individuals, risks are difficult to be determined. In particular, medical improvements may increase the average lifetime. In consequence, insurance companies and other providers of financial products offering longevity pension solutions would need to bear risks which are difficult to determine with standard methods.

It is therefore an object of the present invention to provide a system and a method for operating a return generation system. The system should provide monetary returns to a group of individuals, especially in view of longevity payments. The system should be capable of dealing with uncertain and potentially increasing average lifetime of the individuals. A further object of the invention is to provide an investment system and method with increased returns as compared to traditional systems. Because of this increased returns, entities can use the system for other entities, e. g. employers for their employees or for themselves.

According to the present invention, these and other objects are solved with a method and a system according to the independent claims.

The method according to the invention is used for operating a return generation system. In particular, the method is used for creating payments in a longevity payment model. In a first step of operation, a group of a plurality of individuals is defined. Such a group can be typically a group of individuals who want to invest money or other assets in particular in view of longevity payments. However, such a system can also be attractive for investors looking for alternative investment opportunities. In particular, the group may also be a group of individuals belonging to a community such as political communities, having a common employer or common religion.

In a further step, at least one asset is gathered from each of said individuals. Typically, the system is open for any kind of asset. An asset can be any kind of asset, tangible or intangible and may also be a right to use another asset. Assets which are particularly preferred will be defined hereinafter. Said at least one asset is subsequently transferred to a pool of assets.

Upon death of one of the individuals of the group, the system automatically calculates a rate which can be distributed to each of the surviving individuals. It is also possible to make such determination on regular basis, e. g. monthly, and to consider the assets of all individuals deceased in a certain period. If a certain number of individuals participate in this method and if a large number of assets are involved, the value of which constantly may change, such an automatic calculation is necessary. In addition, it may be necessary to continuously take into account up to date information relating to mortality. In a final step, the asset which has been provided by said individual is at least partially distributed among the surviving individuals within said group. According to the present invention, a plurality of assets may be added to the pool. Returns are distributed to surviving individuals on the basis of assets of individuals within the group which die first.

Typically, the assets may be any asset that is sufficiently marketable and that does not lose its value immediately upon death of the person that held it, e. g. property rights of any kind such as real estate, equity, bonds but also of life insurance policies.

According to the method of the present invention, payments to the individuals may be made according to a predetermined decumulation plan. Typically, payments may start at a relatively old age, e. g. at the age of 80 or 85.

According to an alternative embodiment of the invention, it is also conceivable to reimburse the asset at least partially to the individual, if the individual is still alive after a predetermined period of time. In case the individual should die during this predetermined period of time, the asset will be distributed at least partially among the surviving individuals from the group.

According to one embodiment of the invention, the asset may be a life insurance policy. In this case, the life insurance policy will be ceded to the pool of assets. In case the individual should die, the insurance will be paid to the pool and may be distributed among the surviving individuals from said group.

In order to allow for a correct function of the system, the method optionally and preferably may comprise a further step of verification whether the asset is in a good standing when a contract between a company offering such a return generation system and an individual is signed. Such verification may be especially important in case of life policies, real estate or in the case of assets having a risk of falsification or loss of value otherwise. In case of life policies, it will be essential to determine whether all premiums regularly have been paid. In case of real estate, it may be necessary to determine whether the individual indeed is the owner of such real estate. In case of other objects such as e. g. pieces of art, it may be necessary to verify the authenticity of such assets. According to a preferred embodiment of the invention, this verification may be done by establishing a data transmission connection with an authentication organisation and/or process. Before legally binding signature of an agreement, the status of the asset is authenticated. Especially, in case of life insurance policies, a data connection with an insurance company which has issued said life policy or with a reinsurance company may be established. Authentication in this case only is made when the life policy is in a good standing.

In particular, it is possible to make a distinction between different sorts of assets, e. g. physical assets such as cars, pieces of art, real estate on the one hand and less tangible assets such as stocks, insurances, funds and the like. Depending on the category of asset, different verification may be necessary. In particular, a direct digital authentication process will be possible with assets such as funds, bonds or stocks which are regularly listed or such as insurances. A partly physical authentication and valuation process will be done for more tangible assets such as collections, pieces of art and the like. The verification may include verification of a status, valuation and tracking. In particular, verification may also include initial and continuous determination of the value of the assets.

According to a further preferred embodiment of the invention, authentication steps are repeated at predetermined or pre-determinable periods. In particular, the current value of an asset may be valuated. It may, e. g., be regularly verified whether premiums for a life policy are paid or that a property has been well kept or the asset is in good standing. In case authentication provides a negative result, e. g. shows that premiums for a life policy have not been paid or shows that certain assets are not in the possession of the individual anymore, any allocation to the individuals may be automatically adjusted or blocked.

Typically, the method according to the present invention may be run by an intermediary. Especially, operation may include making agreements with individuals, gathering assets, calculating applicable rates and effecting payments to individuals. Such an intermediary typically may be selected from the group of pension funds, insurers, re-insurers, banks, asset managers, wealth managers or brokers. In such a case, the asset would be transferred to the pool by the intermediary. Payments to the individual also will be made by this intermediary.

According to a further embodiment of the invention, it is also possible to guarantee a certain level of allocation to each of said individuals or to some of the individuals if desired by the individuals. In this case, the system and method according to the invention would be a combination between a traditional economic model and a longevity payment model as outlined above.

The method according to the present invention may be run by a computerised system. In particular, if a large number of assets such as equity, bonds are involved, a real-time calculation on the basis of a computer system will be necessary. This is especially important in view of a large number of individuals and assets involved in this system.

For establishing a contract between an issuer of such a system and an individual, a point of sale software preferably is used. In a first step, the individual defines one or more assets which should be transferred to the pool. Subsequently, the individual specifies a term during which the asset shall be transferred to the pool. Certain assets cannot be transferred for a predetermined period of time from the pool but necessarily must remain within the pool once they have been transferred while other assets may be transferred back after a certain period of time within limitations.

The individual further selects a desired amount and frequency of income. The point of sales software finally determines whether such a payment is possible on the basis of the assets and term which have been determined by the individual. For assets which may necessitate sales by the pool such a real estate, the individual might optionally define an order in which the assets must be realised to pay an income to the individual.

If agreement on these terms is made, a contract will be signed.

It is possible to distribute the assets to surviving individuals by means of cash payments or also by means of an addition to an asset portfolio which is attributed to each of the individuals.

According to another embodiment, upon signature of a contract, the assumption is made that the asset has a certain status and value. This assumption allows for a quick signature of a contract although the result of an authentication or verification step is not yet known. According to this embodiment, an insurance premium is collected from said individual for insuring the risk of assets which are not in a good standing or which have a value different from the assumed value.

This concept can also be independently used for other processes. Many processes, e. g. also manufacturing processes need verification as to whether a certain parameter is false or true before start of the process. In many cases, processes may therefore not be started until the result is known. Time may be lost in this context. Against payment of an insurance premium, such a process may start immediately. The insurance premium is used to ensure the process against the risk of a negative verification of the parameter. It is therefore possible to immediately start such a process without the need of knowing whether certain parameters are fulfilled or not.

The system according to the invention is used for generating a return, in particular for generating longevity payments. The system comprises a group of individuals. The system further comprises a pool of assets. Each of said individuals has transferred at least one asset to this pool. The system further includes an administrative organisation or process for determination a distribution of assets to surviving individuals in case of death of one of said individuals. Typically, the complete system may be managed by this administrative organisation. Appropriate computational means may be provided for this purpose.

According to a further aspect of the invention, an operating system is provided which integrates in a new market of assets related to the life of a participant both, existing assets and new such assets.

Furthermore, the system may include several software tools. The system e. g. may include a point of sales tool for risk profiling of an investor, asset allocation and also for projecting potential returns for a specific investor.

Different verification and valuation modules may be used for different types of assets. Typically, a first type of assets including intangible assets may be easily digitally verified, authenticated, evaluated and tracked. This includes typically valuation and tracking of stocks, funds, bonds. A second category of assets such as real estate or other valuables may need a combination of a digital and physical verification, authentication, valuation and tracking.

The system also may include a mortality modelling tool for determination of guarantee pricing and also for determination of capital requirements of a specific individual. This module is used to determine the amount of return on the basis of current mortality data. Mortality data may continuously change. It is preferred in this context to provide a direct data connection between said mortality modelling tool and mortality data bases.

According to a further embodiment of the invention, the system comprises a verification exchange tool. The verification exchange tool is used for verification of the status and value of the asset or the assets. In particular, it is preferred to provide a verification exchange tool with a communication interface for establishing a direct communication with an authentication organisation. In case of life policies, this may be typically a data connection to a reinsurance company which possesses immerse information relating to the status of life polices or which at least has direct contact to insurance companies for such verification purposes. The system may also be designed for regular periodical authentication, valuation or tracking of the status or value of these assets.

The system further may be provided with a survivor credit modelling module which is used to determine the distribution philosophy or the distribution of credits to survivors in particular.

The system may further include strategic decision software e. g. for determination of optimal risk retention of optimal market segments to target or pricing of retained risk or determination of required capital.

The invention will now be shown with reference to the accompanying figures which show:

FIG. 1a An overview over the system according to the present and 1b: invention

FIG. 2: a schematic representation of a verification exchange method

FIG. 3: a schematic representation of several phases in the life of an individual participating in the system according to the present invention FIG. 4a several embodiments for payments and distributions to 4d: according to the present invention.

FIG. 5a: a flow chart in view of input of investor data

FIG. 5b several screen shots of a point of sales software to 5f:

FIG. 1a shows the system of the present invention. The invention is based on the overall concept that investors (called L-investors in FIG. 1). Each of these investors transfers certain assets to a pool. The assets may include typical economic assets both tangible such as property rights, real estate and intangible like bonds, stocks or life policies. The investor further provides fees for services $. The investor is transferring at least a part of the assets to the pool with no right of refund. In case of death of the investor, the asset will remain within the pool and may be distributed to other investors participating in the system according to the invention. This fact is shown in FIG. 1 as the transfer of a life asset by the investor to the pool. The core of the present invention is a model where in a pool assets of a plurality of investors are held and managed. Because of the fact of distributing assets to surviving investors in case of death of one of the investors, this model is called life exchange model in analogy to the stock exchange model.

The system may also include organisations such as pension funds, insurers, bank, unitised fund managers, wealth managers or other entities which may provide financial products. Typically, these organisations may also play the role as an intermediary in the present system.

The system is based on several software tools. A point of sales software is used for information of the investor, in particular for estimation of returns. A mortality model is used for determination of estimated return rates based on current and projected mortality information. The mortality model may be connected or connectable to a mortality data base which may be provided by governmental authorities or education institutions, professional organisations or other institutions having expert knowledge of the subject matter via a data communication link L.

Further software tools include a survivor credit model. The survivor credit model is used to determine the distribution of assets to survivors. Typically, a general distribution philosophy and the distribution of specific credits to the investors may be determined. Strategic decision software may be used by the intermediaries for strategic management purposes, i. e. in view of optimal risk retention or in view of the choice of best market segments. A verification exchange tool is used for verification as to whether the assets transferred by the investors to the pool are still valid. This may be automatically done by sending a request to a data base operated by an authentication bureau (see also FIG. 2) through a verification communication link V.

FIG. 1b shows in some more detail a verification, authentication, valuation and tracking process. Intangible economic assets such as funds, stocks, bonds and the like are digitally authenticated. More tangible assets such as real estate and the like are verified, authenticated, evaluated and tracked by means of digital and physical processes. A market of life-based assets includes both, tangible and intangible economic based market assets.

FIG. 2 shows in more detail an authentication and valuation method according to the present invention. One asset which can be typically transferred to the pool is a life policy of the investor. By ceding the life policy to the pool, in case of death of the investor, a life insurance will be paid to the pool. The life exchange system LX may e. g. establish direct contacts with banks, insurers etc. Verification as to whether the life policy is in a good standing before any payment to the investor will be made. For this purpose, the life exchange LX is communicating with an authentication bureau through a verification communication link V. In particular, the authentication bureau may have a direct connection to reinsurance companies which usually have direct access to data relating to life policies in insurances issued by a plurality of insurers.

The point of sales software shown in FIG. 1a is used to inform the investor. The software typically may include an investor risk profiling tool, a tool for determination of an optimal asset allocation and a tool for calculation of potential returns.

FIG. 3 typically shows four different stages in the lifetime of an investor participating in the system according to the present invention. In three phases 1, 2 and 3 a certain capital or assets are accumulated by an investor. In a fourth phase, the portfolio is decumulated by payments to the investor. The first phase 1 is typically a phase of premium payments. This can be a single or a regular payment of a premium. The fund increases due to normal investment returns and due to the addition of new premiums. In a second phase 2, no premiums are payable anymore. If the investor dies, the whole capital amount will be returned to his estate. This phase typically is an optional phase and it can be absent if it is not selected by the investor. The funds still increase during this second phase due to normal investment returns.

In a third phase 3 so-called annuitisation starts. If the investor dies, the capital amount reverts to the pool. There is an increase of the funds due to the normal returns during this third phase. In addition, the return is above comparable investment return in view of assets of dying investors which are attributed to the pool.

In a fourth phase F funds are reduced by the investor receiving an income from his fund. The funds are increased through normal investment returns and also through addition of assets of other investors who have died in this period.

FIG. 4a-4d show typical examples of accumulation and decumulation models. Adjustments may be made for investors of different genders or different levels of assessed state of health. According to FIG. 4a, regular payments may start at the age of the investor of 35 and may go on until the age of 60. Annuitisation as shown on phase 3 starts at the age of 65 and an income is drawn after the age of 85. FIG. 4a typically shows a mechanism where payments for longevity situations, i. e. after an age of 85 are made.

FIG. 4b shows an embodiment where one single premium is made at the age of 65. Annuitisation starts at the age of 70 whereas drawing of an income starts at 85. The example shown in FIG. 4b shows, that even for investors who did not participate in the system at a longer age, a longevity investment solution according to the model of the present invention is possible.

Figure 1A:
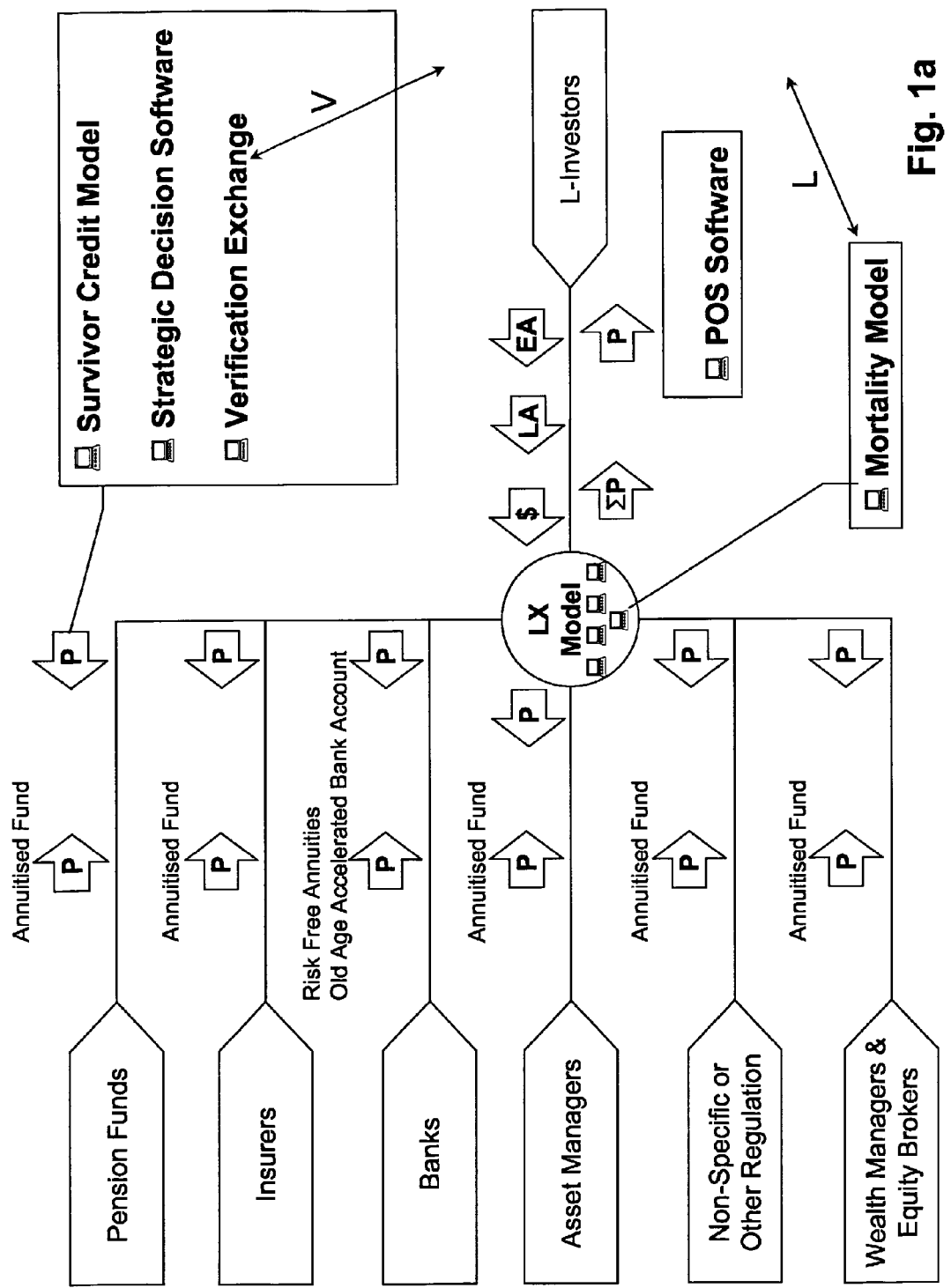
Figure 1B:
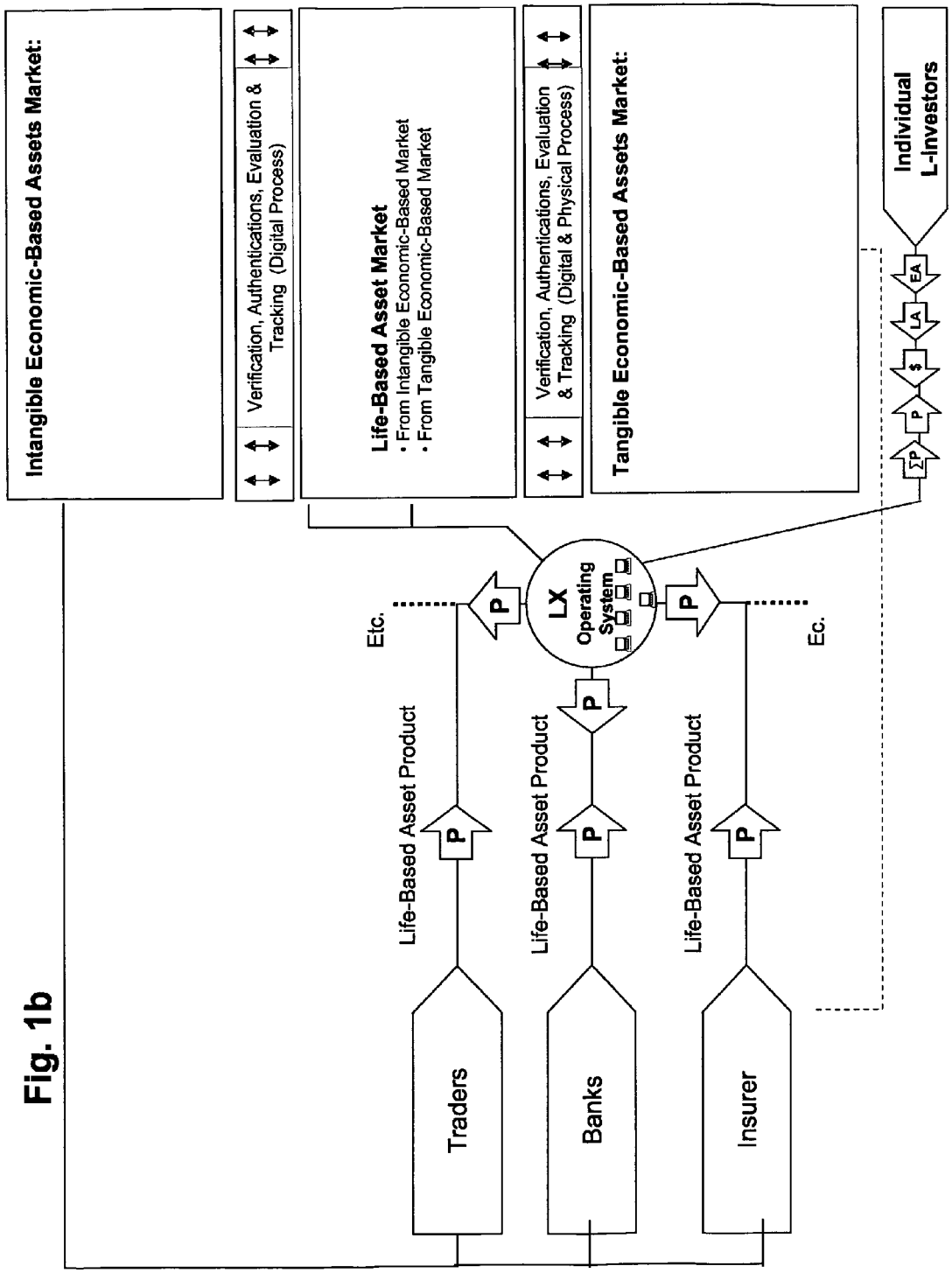
Figure 2:
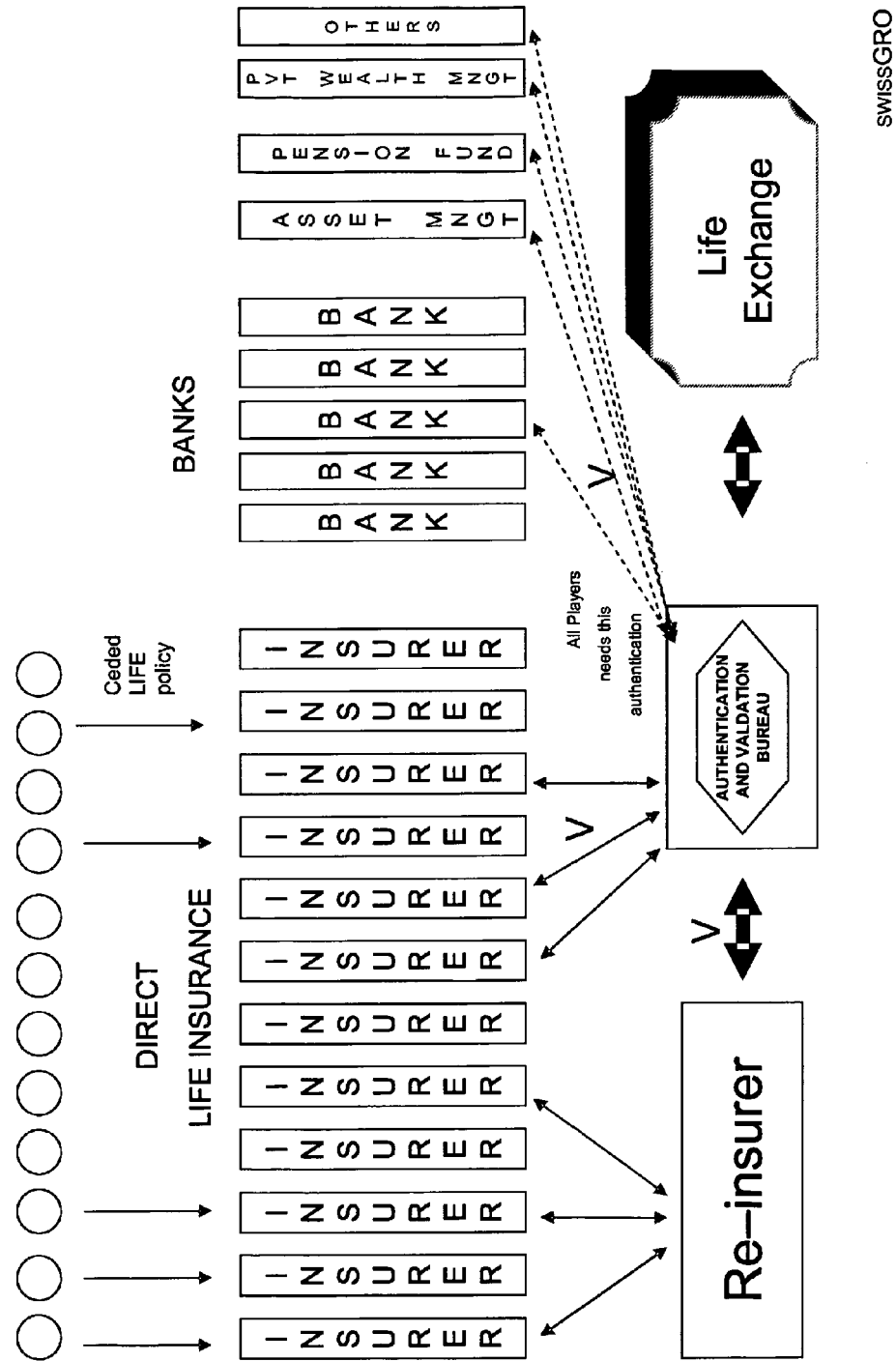
Figure 3:
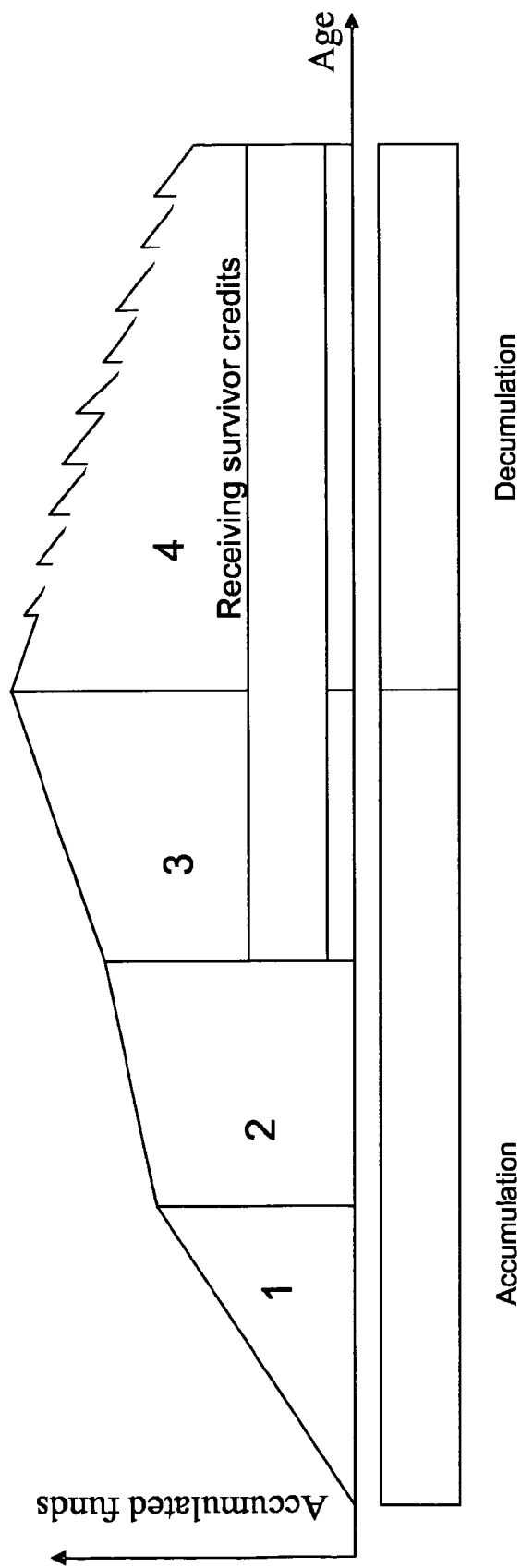
Figure 4A:
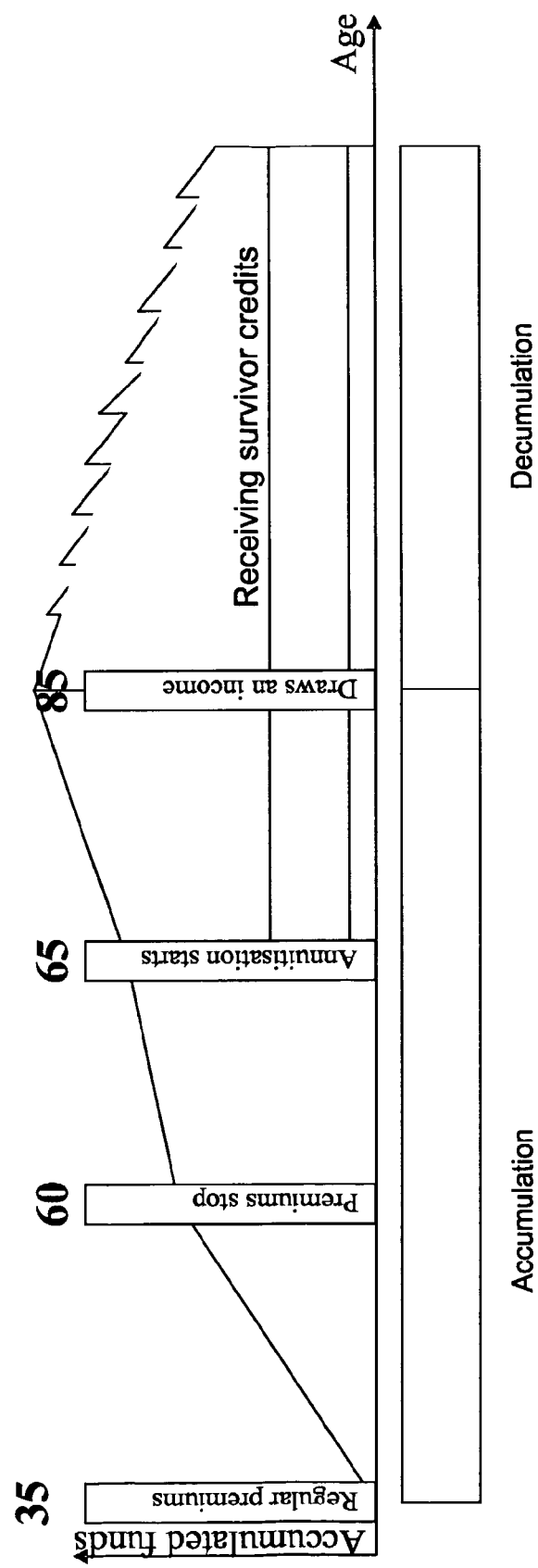
FIG. 4c shows an alternative embodiment where one single premium is paid at 65 and annuitisation starts at the same age. In view of the immediate and final transfer of the assets to the pool in case of death of the investor, potential returns according to this model will be higher.
FIG. 4d shows a further example where a single premium payment is made at the age of 85 only. Annuitisation and drawing of an income start at the same time.
Figure 4B:
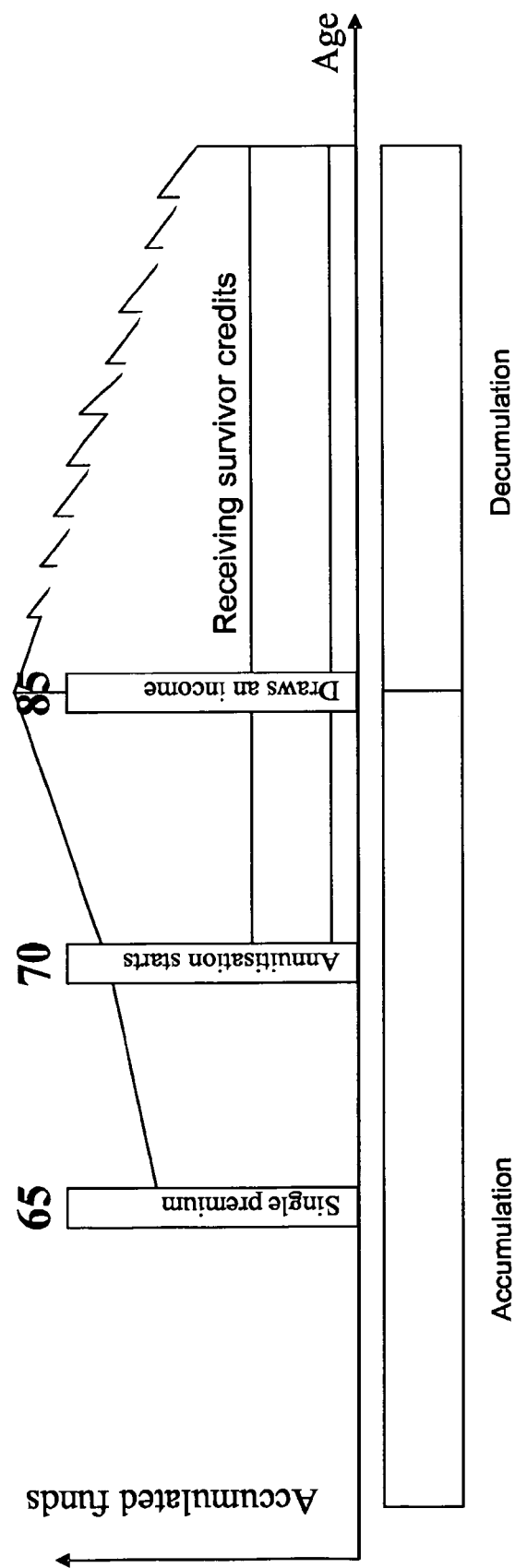
Figure 4C:
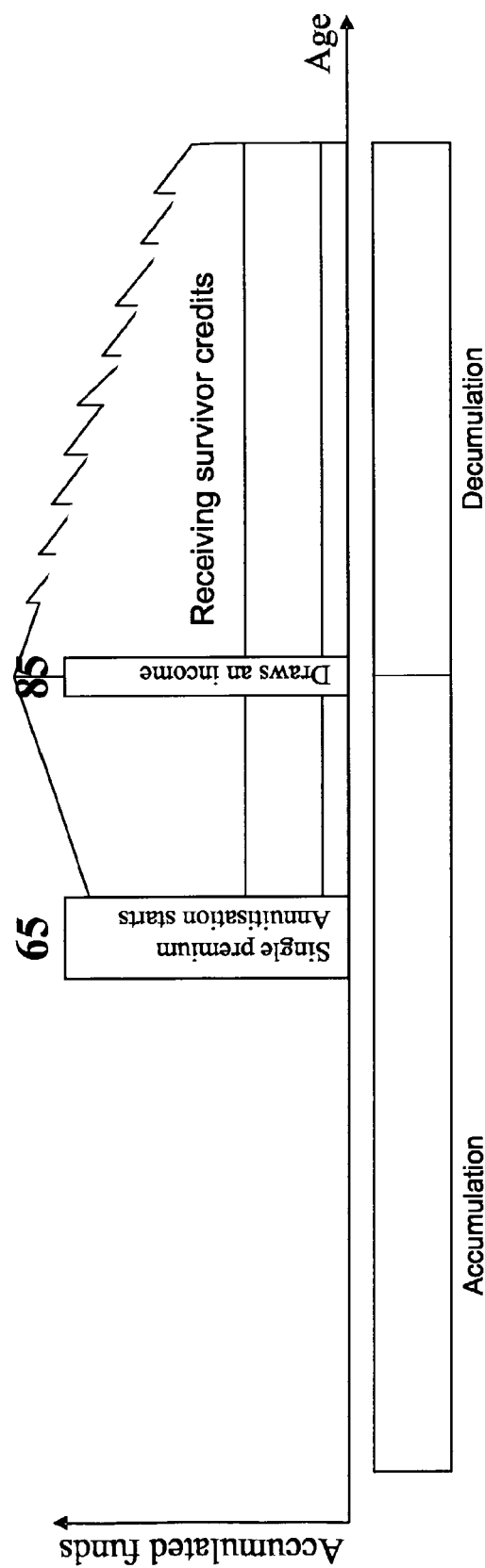
Figure 4D:
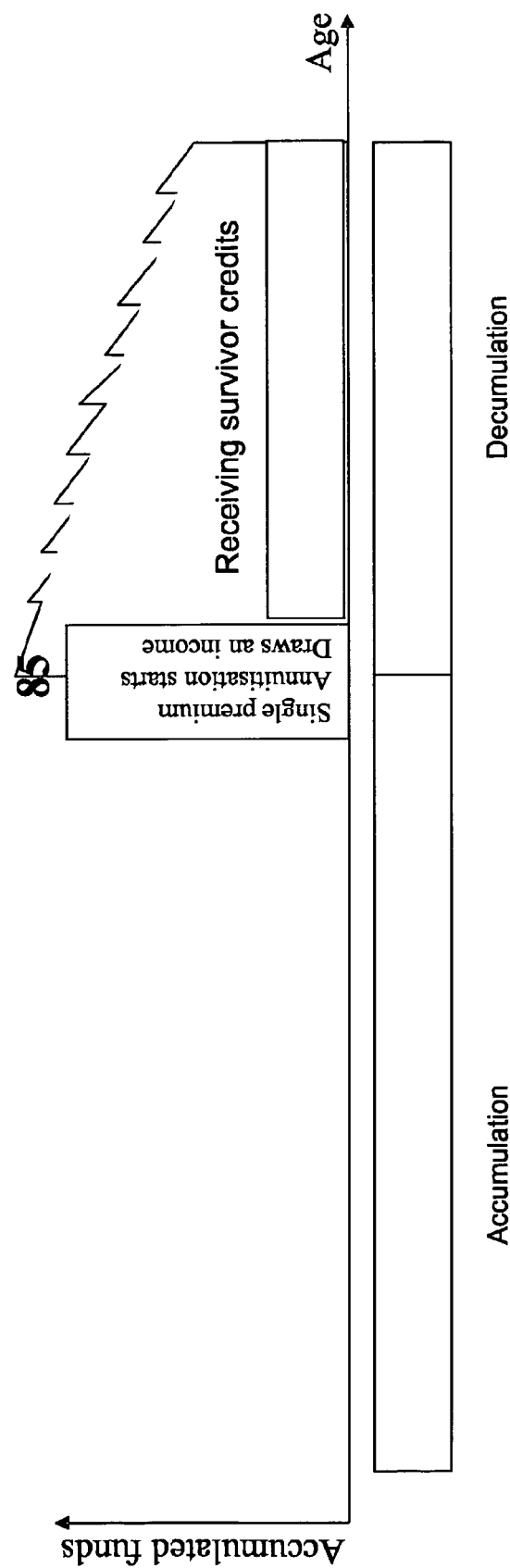
Figure 5B:
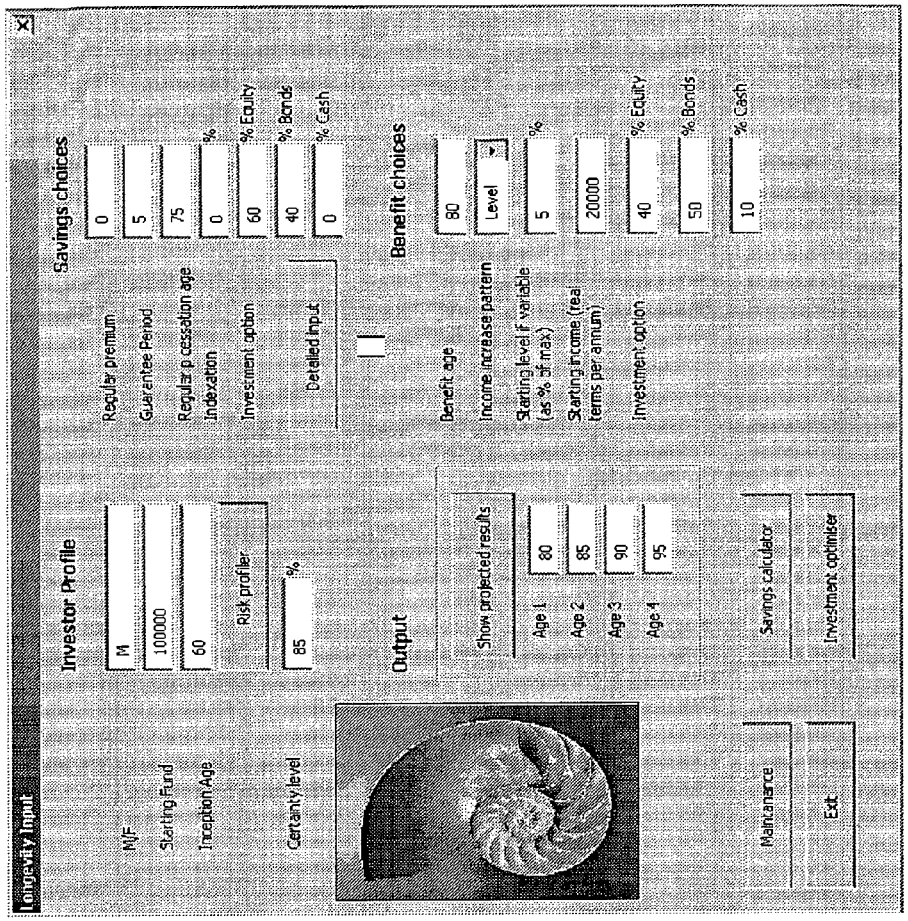
Figure 5A:
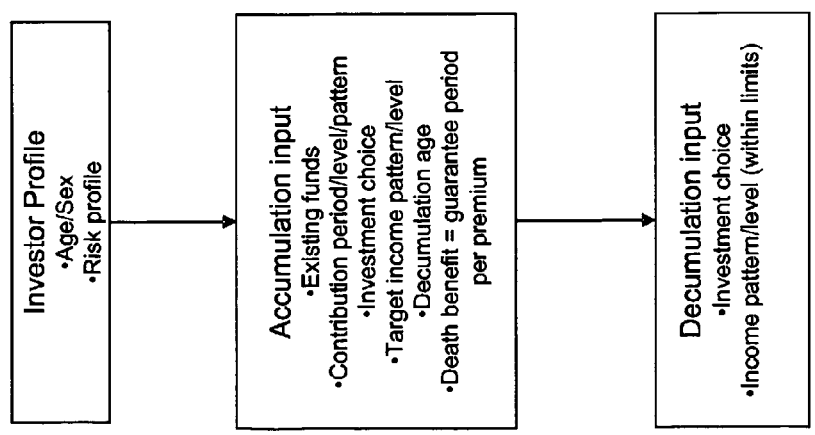

FIG. 5a shows a flow chart for the process which is made in the point of sales software. An investor sets an investor profile, namely including parameters such as age, sex and a specific risk profile. In a further step, information relating to accumulation is entered into the system. This information typically includes existing funds, a contribution period, level or pattern, the choice of specific investments. Furthermore, a desired income pattern and level will be introduced.

In view of payments, a decumulation age is given. For each premium which is paid, a guarantee period may be individually chosen. During this guarantee period, in case of a death, any assets transferred to the pool will be returned partially or fully to the estate of the participant of the present system.

In a final step, in a input relating to decumulation information in view of income pattern and level and also in view of an investment are given.

FIG. 5b shows a screen shot of a software programme for a point of sales software. The investor may input specific data. Based on these data, specific returns may be calculated. In a risk profiler (see FIG. 5c), other parameters relating to the risk of the individual may be added. Typically, questions such as:

How long before you want to start withdrawing from this investment?
What percentage of your retirement provision does this investment represent?
What is your main objective with the investment?
How would you describe your health?
Which is your preferred portfolio?
What investment experience do you have?
How is your attitude towards financial matters?
What decrease in the total value of your investment in the short term would make you feel uncomfortable?
How do you interpret financial risk?
Which of the following investments of $ 10,000.—over five years would you prefer if you had to choose?

Based on these information, an investor profile will be calculated which subsequently may be used for determination of returns generated by the present system.

Figure 5D:
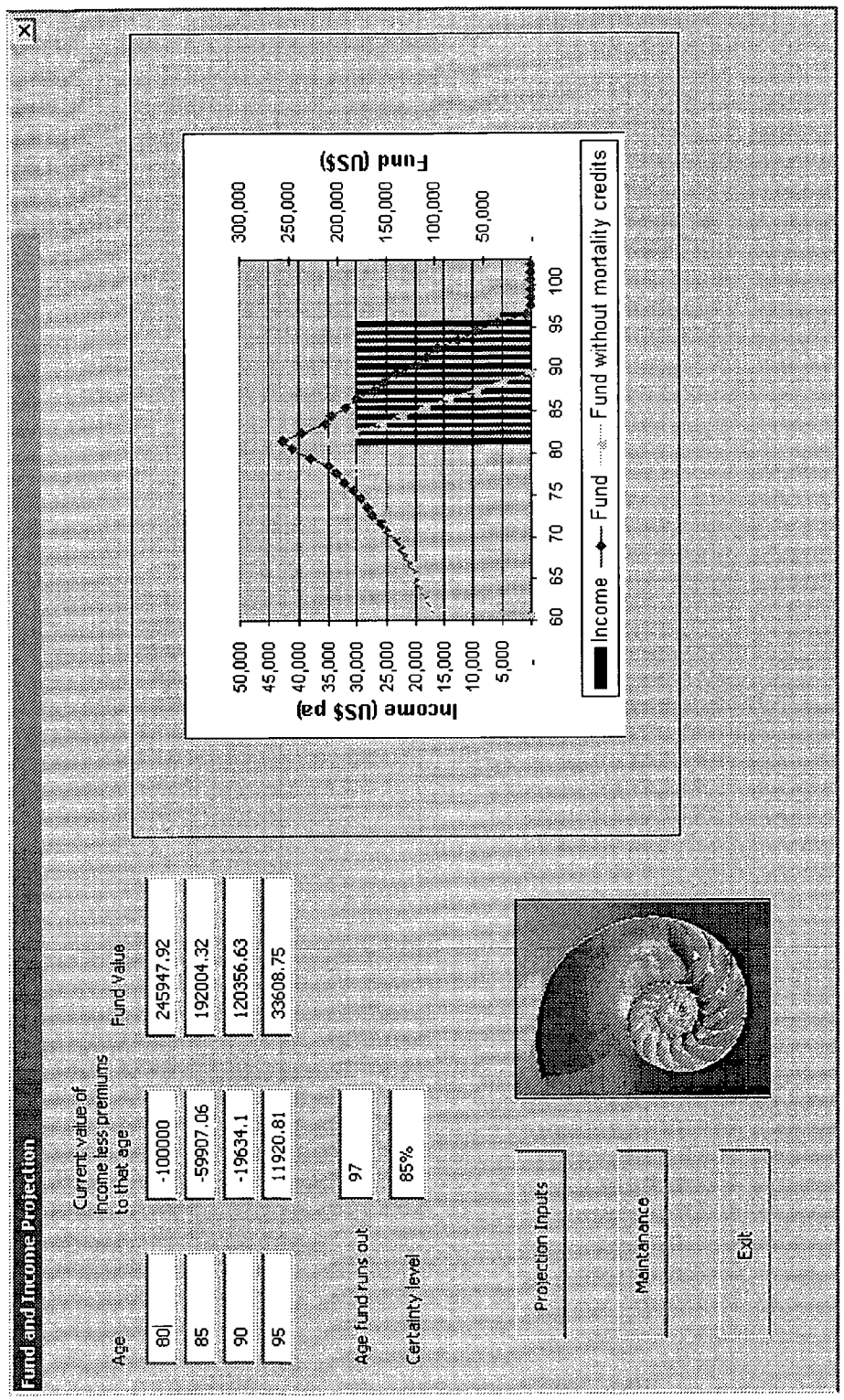

FIG. 5d shows the output for the fund and income projection based on information provided according to FIGS. 5b and 5c.

Figure 5E:
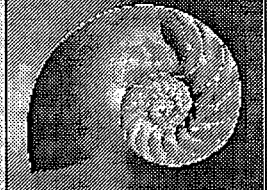
Figure 5F:
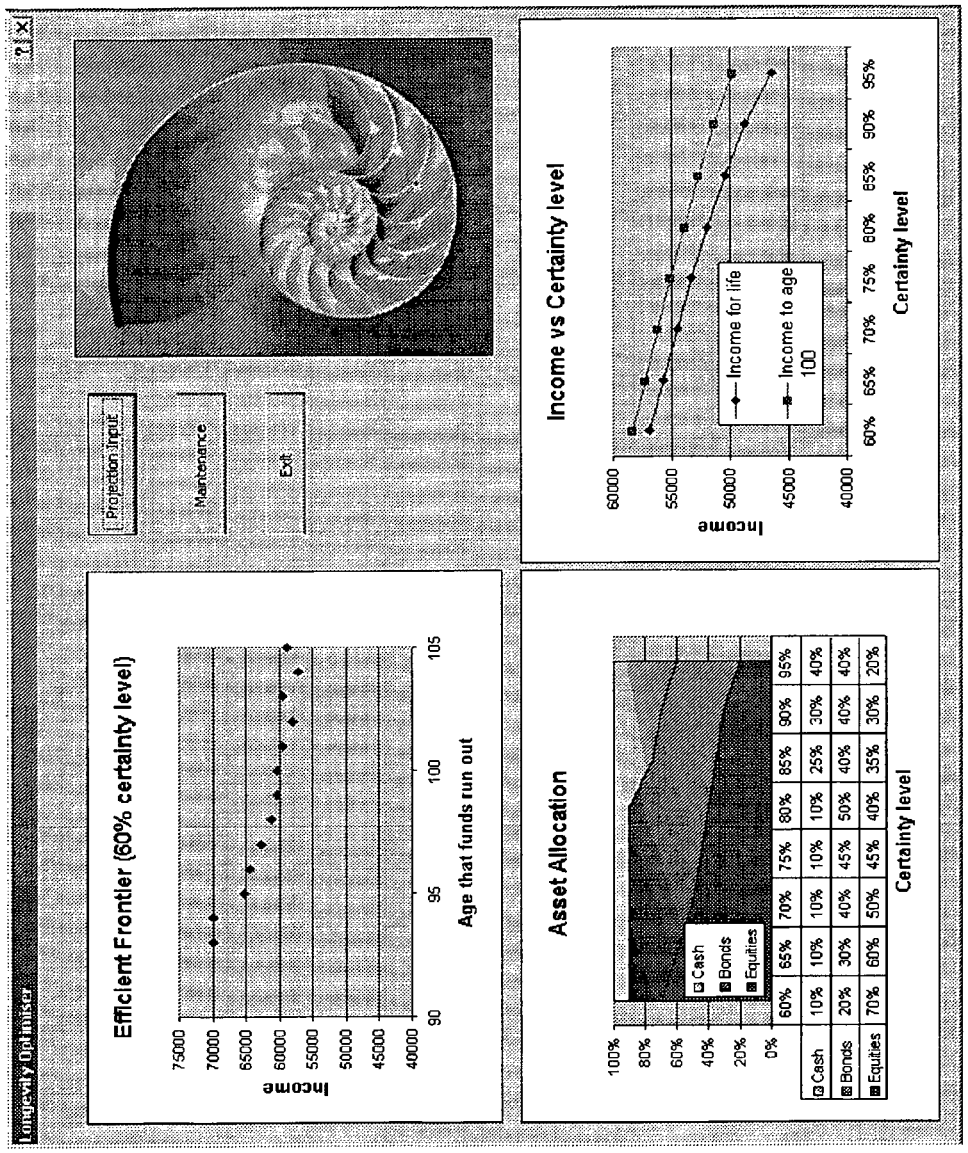

FIG. 5e shows a screenshot of savings calculators and FIG. 5f shows a screenshot of a longevity optimising text.

Figure 6:
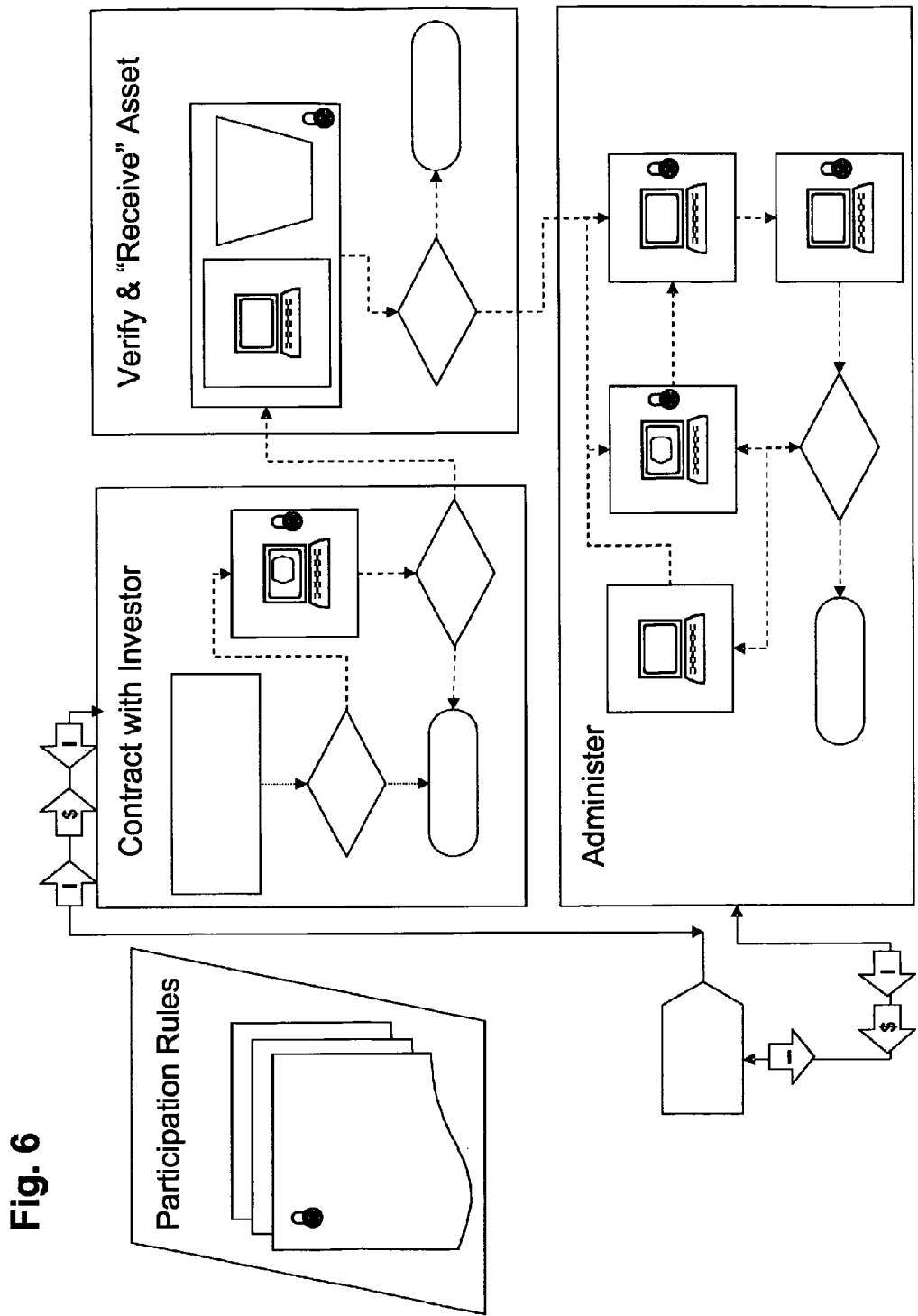

The specific steps for operation of one embodiment of a method according to the present invention are shown in FIG. 6 and will now be described in more detail. In the following text, italic and bold terms shall designate action or activities, underlined terms shall designate objects of action or of activities and highlighted terms shall designate software elements. In a first step, rules for participation in the model according to the invention shall be defined.
Determine the LBAM Participation Rules
Macro Input
What:
Supplied by:
Meso Steps
Set the LBAM Charges Rules
Set the LBAM Investment House View
Determine the LBAM Minimum Term
Determine the LBAM Minimum Entry Value and Thresholds
Determine the LBAM Asset List
Determine the LBAM Income Rules
Macro Output
What: The LBAM Participation Rules
Consumed by: Steps 2, 3, 4
1.1 Set the LBAM Charges Rules
Meso Input
What:
Supplied by:
1.1.1 Determine the LBAM Expense Charges, i.e. the charges that will be levied on Investor portfolios to recoup the expenses of the LBAM Market
1.1.2 Determine the LBAM Guarantee Charges, i.e. the charges that will be levied on Investor portfolios to reward the LBAM Market for the risk of offering guarantees
1.1.3 Determine the LBAM Profit Charges, i.e. the charges that will be levied on Investor port-folios to provide profit reward to the LBAM Market
1.1.4 Document all the different charges into LBAM Charge Rules document
Meso Output
What: The LBAM Charge Rules document
Consumed by: Steps 2 and 4
1.2 Set the LBAM Investment House View
Meso Input
What: The LBAM Asset List
Supplied by: Step 1.5
FOR assetclass =1 to [number of assets on the LBAM Asset List]
   FOR time =[present year] to [long-term future]
     Formulate a best estimate view on investment-return$_{time}^{assetclass}$
     Record and document investmentreturn$_{time}^{assetclass}$
   NEXT time
NEXT assetclass
Meso Output
What: The LBAM Investment House View document
Consumed by: Steps 2, 4
1.3 Determine the LBAM Minimum Term
Meso Input
What:
   The LBAM Survivor Credit System
   The LBAM Charges Rules
Supplied by:
   Steps 1.1
1.3.1 Run the LBAM Survivor Credit System on a best estimate mortality basis for all possible ages and record the projected LBAM Survivor Credits at each age (x) for an average portfolio (μ) i.e. LXCredit$_x$ μ
1.3.2 Retrieve the sum of all charges for participation of an average portfolio (μ) in the LBAM Market at each contract duration (t), i.e. LXCharge$_x^\mu$ from the LBAM Charges Rules
1.3.3 Retrieve the best estimate of investment return for all terms (t) from the present, i.e. discountrate$_t$, from the LBAM Investment House View
1.3.4 Record LXterm$_x$ for each age (x) by using the following process:
   Let x=age, t=term and μ=the average portfolio size
   For age =0 to upper limit
   For term =1 to upper limit $$IF \sum_{term} \left( \frac{LXCredit_x^\mu - LXCharge_t^\mu}{(1 + discountrate_t)^t} \right) > 0$$

THEN LXterm$_x$ =term AND GOTO next age
     ELSE Next term 1.3.5 Define the LBAM Minimum Term for each Investor entry age (x) as $LXterm_x$
Meso Output
What: The minimum term of participation that will be allowed for every possible Investor entry age
Consumed by: Step 2
1.4 Determine the LBAM Minimum Entry Value and Thresholds
Meso Input
What:
 The LBAM Survivor Credit System
 The LBAM Charges Rules
 The LBAM Minimum Term
Supplied by:
 Steps 1.1, 1.3
1.4.1 Run the LBAM Survivor Credit System on a best estimate mortality basis for all possible ages and record the projected LBAM Survivor Credits at each age (x), i.e. $LXCredit_x$
1.4.2 Retrieve the sum of all charges for participation in the LBAM Market at each contract duration (t), i.e. $LXCharge_t$ from the LBAM Charges Rules
1.4.3 Retrieve the best estimate of investment return for all terms (t) from the present, i.e. $discountrate_t$, from the LBAM Investment House View
1.4.4 Record $LX\,min^x$ for each age (x) and minimum term (t) by using the following process:
 Let x=age
 Let v=value of portfolio at entry
 For age =0 to upper limit
 FOR v=0 to upper limit $$IF \sum_{term}\left(\frac{LXCredit_x^\beta - LXCharge_t^\beta}{(1+discountrate_t)^t}\right) > 0$$

THEN $LX^x$=v AND GOTO next age
 ELSE Next v
1.4.5 Define the LBAM Minimum Entry Value and Thresholds for each Investor entry age (x) as $LX\,min^x$
Meso Output
What: LBAM Minimum Entry Value and Thresholds
Consumed by: Steps 2, 3, 4
1.5 Determine the LBAM Asset List
Meso Input
What: The universe of available asset classes
Supplied by:
1.5.1 List all asset classes that can be held by natural persons
1.5.2 Remove those asset classes that lose all or a substantial part of its value upon the death of the natural holder
1.5.3 At the discretion of the LBAM Market remove those remaining asset classes that do not offer a sufficiently attractive liquidity & value proposition for market-making purposes according to selected thresholds
1.5.4 Define the remaining assets classes as the LBAM Asset List
Meso Output
What: The asset classes that are accepted for participation in the LBAM Market
Consumed by: Steps 2, 3
1.6 Determine the LBAM Income Rules
Meso Input
What: The LBAM Asset List
Supplied by: Step 1.5
1.6.1 DO FOR ALL asset classes on the LBAM Asset List
 IF asset class is traded on a financial exchange
 THEN the asset class is eligible for income drawdown
 ELSE the asset class is ineligible for income drawdown
1.6.2 Define the list of asset classes eligible for income drawdown as the LBAM In-come Assets
1.6.3 Define the drawdown rules for each asset class on the list of LBAM Income Assets
1.6.4 Define the LBAM Income Rules as the combination of the LBAM Income Assets and the drawdown rules per asset class
Meso Output
What: The list of asset classes where the Investor will be allowed to draw an income during his/her term of participation
Consumed by: Steps 2, 4
Once the participation rules have been defined, contracts with an investor may be made. The following steps show how such a contract will be generated:
2 Contract with Investor
Macro Input
What: A non-participating Investor
Supplied by:
Meso Steps
 The Investor offers contract terms to the LBAM Market
 The LBAM Market reacts to the offer
 Determine the LBAM Investor Risk Profile
 Perform an LBAM Participation Projection
Macro Output
What: A participating Investor
Consumed by: The LBAM Market
2.1 The Investor offers contract terms to the LBAM Market
Meso input
What: Interest to possibly contract
Supplied by: The potential Investor
2.1.1 The Investor specifies the participation term for which he/she wishes to participate in the LBAM Market and the length of the initial period during which a capital guarantee should apply
2.1.2 The Investor specifies the asset class and defines the individual asset which he/she wishes to offer for participation in the LBAM Market
2.1.3 The Investor specifies the value of the individual asset which he/she wishes to offer for participation in the LBAM Market
2.1.4 If income is required, the Investor specifies the income that he/she wishes to receive from the offered asset for the duration of the asset's participation in the LBAM Market, the age from which an income is to be paid and the level and shape of that income
2.1.5 If initial investment rebalancing is required, the Investor specifies the required rebalancing of the offered asset
Meso Output
What: Proposed contract terms
Consumed by: Step 2.2
2.2 The LBAM Market reacts to the offer
Meso Input
What: Proposed contract terms
Supplied by: Step 2.1
2.2.1 IF the offered Participation Term and initial guarantee term complies with the LBAM Minimum Term
 THEN proceed to next step
 ELSE decline offer AND inform Investor of reason
2.2.2 If the offered asset class complies to the LBAM Asset List
 THEN proceed to next step
 ELSE decline offer AND inform Investor of reason 2.2.3 If the offered asset value complies to the LBAM Minimum Entry Value and Thresholds
    THEN proceed to next step
    ELSE decline offer AND inform Investor of reason
2.2.4 If the requested income requirement complies with the LBAM Income Rules
    THEN proceed to next step
    ELSE decline offer AND inform Investor of reason
Meso Output
What: Acceptance/rejection of proposed terms
Consumed by: Step 3 (if accepted)
2.3 Determine the LBAM Investor Risk Profile
Meso Input
What: Interest to potentially contract & Acceptable proposed contract terms
Supplied by: Step 2.2
2.3.1 The Investor completes the LBAM Risk Profile Questions on the LBAM POS Software
2.3.2 Run the LBAM POS Software
2.3.3 Record the investor's risk profile
Meso Output
What: Investor risk profile (to be used to ensure informed decision making by Investor)
Consumed by: Step 2.4
2.4 Perform an LBAM Participation Projection
Meso Input
What: to potentially contract & Acceptable proposed contract terms
Supplied by: Step 2.2
2.4.1 Enter the Investor's age, participation term, asset class, asset value and income requirements on the LBAM POS Software
2.4.2 Run two projection scenarios on the the LBAM POS Software
  using a best estimate of investment return and mortality
  using cautious estimates of investment return and mortality, where the degree of caution is determined by the LBAM Investor Risk Profile
2.4.3 Show both projections to the Investor, on the basis of which the Investor accepts & signs the LBAM Contract or not
Meso Output
What: Projected future outcomes
Consumed by: Steps 3, 4
Once a legally binding contract has been made, the market will receive the offered asset. The steps for this procedure will be shown hereinafter:
3 The LBAM market receives the offered asset
Macro Input
What: Agreed contract terms
Supplied by: Step 2
Meso Steps
Accept the offered asset
Perform initial rebalancing of the Investor portfolio
Macro Output
What: Rights to use of asset on death of Investor now held by LBAM
Consumed by: Step 4
3.1 Accept the offered asset
Meso Input
What: Details about the asset being offered to the LBAM Market
Supplied by: Step 2
3.1.1 Confirm if Investor is legal owner of the asset using the LBAM Verification Exchange
  IF Investor does hold legal title
    THEN proceed to next step
    ELSE revoke LBAM Contract AND revert to Investor with reason
3.1.2 Confirm market value of the asset using the LBAM Verification Exchange
  IF value complies with LBAM Minimum Value
    THEN proceed to next step
    ELSE revoke LBAM Contract AND revert to Investor with reason
3.1.3 Perform the required administrative and paperwork to accept the asset into the lagal custody of the LBAM Market
3.1.4 Send acceptance notification to the Investor
The verification on the basis of the verification exchange software may be used to confirm that the life policy is in good order. It may also be used to confirm a market value of an asset such as a share or bond. For this purpose, the exchange software may also use data communication connections to data bases which are operated by banks or trading places.
Meso output
What: Confirmation of ownership and value; asset accepted onto the LBAM Market
Consumed by: Step 4
3.2 Perform initial rebalancing of the Investor portfolio
Meso Input
What: Investor instruction regarding rebalancing
Supplied by: Step 2.1
  IF Investor did not request initial rebalancing
    THEN proceed to next step
    ELSE rebalance portfolio AND send completion notification to Investor
Meso output
What: Rebalanced portfolio
Consumed by: Step 4
Assets which are held in the pool by the market will be managed according to state of the art asset management procedures. Specific administration steps will now be shown:
4 Administer the LBAM Market
Macro Input
What: Assets & contracts with Investors
Supplied by: Steps 2, 3
Meso Steps
Perform normal financial market administration
Perform LBAM specific administration
Macro Output
What: Duly administered assets & contracts
Consumed by: Step 4
4.1 Perform normal financial market administration
Meso Input
What: Assets & contract with Investor
Supplied by: Step 2, 3
4.1.1 Record all transactions
4.1.2 Maintain adequate records
4.1.3 Comply with all applicable regulatory requirements
Meso output
What: Asset & contract with Investor, administered according normal and unique LBAM features and requirements
Consumed by: Step 4
4.2 Perform LBAM specific administration
Meso Input
What: Asset & contract with Investor; the LBAM Administration System
Supplied by: Step 4
4.2.1 Administer the LBAM Income using the LBAM Administration System
  For those investor who elected to receive an LBAM Income from their portfolios
    Sell sufficient assets to pay elected income level
      Recoup expenses, guarantee and profit charges from the proceeds according the LBAM Expense Charges, the LBAM Guarantee Charges and the LBAM Profit Charges
Pay LBAM Income
Receive change request
4.2.2 Administer change request to the LBAM income
　Receive change request from the Investor
　IF the requested income requirement complies with the LBAM Income Rules
　THEN proceed to next step
　ELSE decline offer AND inform Investor of reason
　Effect change on LBAM Administration System Notify Investor
4.2.3 Administer change request to the Investor portfolio
　Receive change request from the Investor
　IF the requested income requirement complies with the LBAM Participation Rules
　THEN proceed to next step
　ELSE decline offer AND inform Investor of reason
　Effect change on LBAM Administration System
　Notify Investor
4.2.4 Administer the LBAM Survivor Credits
　Maintain the LBAM Asset and Investor Register, including a record of the value and status of the assets using the LBAM Verification Exchange
　Receive LBAM Notification of Life from Investors and for those Investors who did not provide LBAM Notification of Life, confirm life status of Investor using the LBAM Verification Exchange
　Sell assets of deceased Investors on the open market and calculate the portion of the proceeds net of taxes and costs to be allocated to each live Investor using the LBAM Survivor Credit System
　Distribute LBAM Survivor Credits to living Investors according to Investor choice, either as a cash payout, or as an injection to the portfolio
Meso output
What: Asset & contract administered as per the unique features and processes of LBAM
Consumed by: Step 4

Current economic systems are based on an economic based asset market. It is generally accepted that such a market is fully reversible. In other words, it is not possible to determine whether a specific status of the market is younger or older than a different status of the market. The present is based on a completely different approach. The system is based on a life-based asset market. In view of assets of deceased individuals being transferred to the surviving individuals, this is an irreversible process which leads to a concentration of wealth among the surviving individuals. This life-based asset market is, however, combined with economic based asset markets such as conventional stock exchanges.

The invention claimed is:

1. A method for generating returns and operating a return generation system, in particular a longevity payment system, comprising a computerized system, wherein the following steps are performed:
　providing the computerized system,
　defining a group of a plurality of individuals by the computerized system,
　gathering at least one asset from each of said individuals by the computerized system,
　transferring said at least one asset to a pool of assets by the computerized system,
　upon death of one of said individuals of said group, automatically calculating a rate by the computerized system to be allocated to each of the surviving individuals,
　allocating the asset provided by said individual at least partially among surviving individuals from said group, and
　distributing said asset to said surviving individuals.

2. A method according to claim 1, wherein said asset is selected from the group consisting of property rights, equity, bonds, life insurance policies.

3. A method according to claim 1, wherein said distributing step comprises making payments to said individuals according to a predetermined decumulation plan, adjustable within certain limits.

4. A method according to claim 1, wherein said asset is at least partially reimbursed to said individual only if said individual is alive after a predetermined period of time.

5. A method according to claim 1, wherein said asset is a life insurance policy.

6. A method according to claim 1, further comprising the step of automatically verifying whether an asset is in good standing upon signature of an agreement between an issuer and said individual.

7. A method according to claim 5, further comprising steps of
　establishing a data transmission connection through a communications interface with a verification process, in particular with an insurer having issued said life insurance policy, and
　automatically determining a status and market value of said asset by contacting an verification bureau through a communications link, in particular authenticating whether said life insurance policy is in a good standing.

8. A method according to claim 7, wherein authentication of whether the asset is in good standing is made at predetermined or pre-determinable periods and wherein
　said verification or authentication steps are repeated at predetermined or predeterminable periods and wherein
　any allocations to said individual are automatically adjusted when said verification or authentication provides a negative result.

9. A method according to claim 1, wherein assets are gathered by an intermediary selected from the group of pension funds, insurers, reinsurers, banks, unitized fund managers, wealth managers or brokers, property managers
　wherein said asset is transferred to said pool by said intermediary and wherein said payment to said individual is made by said intermediary.

10. A method according to claim 1, wherein a minimum payment to said individual is guaranteed.

11. A method according to claim 1, comprising the steps of
　the individual defining at least one asset which are to be transferred to said pool,
　the individual specifying a term during which said asset shall be transferred to said pool,
　the individual selecting a desired income plan,
　defining an order in which assets must be realized to pay an income, and
　signing a contract.

12. A method according to claim 1, comprising the step of distributing said asset to said surviving individuals by means of cash payments.

13. A method according to claim 1, comprising the step of distributing said asset to said surviving individuals by means of an addition to a asset portfolio of said individual.

14. A method according to claim 8, comprising the steps of
　making a contract before the result of said authentication is known, and collecting an insurance premium from said individual for insuring the risk of assets which have a lower than assumed value.

15. A system for generating a return, in particular for generating a longevity payment, said system comprising:
a computer;
a pool of assets, wherein each of a group of individuals has transferred at least one asset to said pool; and
an administrative organization for determining and distributing assets by means of said computer to surviving individuals in case of death of one of said individuals.

16. A system according to claim 15, wherein said system includes a point of sales software tool for risk profiling of said investor, asset allocation and/or for projecting potential returns.

17. A system according to claim 15, wherein said system includes a mortality modeling tool for determination of guarantee pricing and/or for capital requirements.

18. A system according to claim 15, wherein said mortality modeling tool is provided with a data transfer interface connected or connectable to a database containing mortality data.

19. A system according to claim 15, wherein the system further comprises a verification exchange tool for verification of a status or valuation of at least one of said assets.

20. A system according to claim 19, wherein said verification exchange tool is provided with a data transmission interface for connection to at least one verification or valuation organization, in particular with a reinsurance company.

21. A system according to claim 15, wherein said system includes a survivor credit modeling tool for determination of a distribution philosophy or of distribution of survivor credits.

22. A system according to claim 15, wherein said system further comprises a strategic decision tool for determination of optimal risk retention and/or for determination of best market segments.

23. A system according to claim 15, the system further including an operating system for integration of traditional, existing assets and life-based assets in a life asset market.

24. A system according to claim 19, wherein the verification exchange tool includes a digital verification module for verifying the status, value of intangible assets and wherein the verification exchange tool includes a digital and physical verification module for verification and valuation of tangible assets.

* * * * *